US007676218B2

(12) United States Patent
Ballai

(10) Patent No.: US 7,676,218 B2
(45) Date of Patent: *Mar. 9, 2010

(54) SYSTEM AND METHOD FOR DETECTION OF A ROUGE WIRELESS ACCESS POINT IN A WIRELESS COMMUNICATION NETWORK

(75) Inventor: Philip N. Ballai, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/416,761

(22) Filed: May 3, 2006

(65) Prior Publication Data
US 2006/0193258 A1    Aug. 31, 2006

Related U.S. Application Data

(63) Continuation of application No. 10/212,291, filed on Aug. 2, 2002, now Pat. No. 7,068,999.

(51) Int. Cl.
*H04M 1/66* (2006.01)
*H04W 24/00* (2009.01)
*H04K 1/00* (2006.01)

(52) U.S. Cl. .................... 455/411; 455/410; 455/456.1; 455/456.5; 380/250

(58) Field of Classification Search ... 455/456.1–456.6, 455/410–411, 550.1, 556.1, 556.2, 457–458, 455/461, 515, 524, 561, 557–558, 41.2, 67.11, 455/67.13, 404.2, 423–425, 432.1, 432.3, 455/433, 435.1, 436, 440, 450, 456.5, 464, 455/466, 500, 509, 513–514, 517; 726/1–7, 726/27–30; 370/310, 328, 312–313, 310.2; 713/153, 155, 182–185; 380/247–250; 705/56, 705/64; 340/539.1, 539.13
See application file for complete search history.

(56) References Cited

U.S. PATENT DOCUMENTS

| 5,973,643 | A  | * | 10/1999 | Hawkes et al. | 342/457 |
|-----------|-----|---|---------|----------------|---------|
| 6,169,497 | B1 | * | 1/2001  | Robert         | 340/988 |
| 6,618,005 | B2 | * | 9/2003  | Hannah et al.  | 342/357.1 |
| 6,754,488 | B1 | * | 6/2004  | Won et al.     | 455/424 |
| 7,042,852 | B2 | * | 5/2006  | Hrastar        | 370/310 |
| 7,068,999 | B2 | * | 6/2006  | Ballai         | 455/411 |
| 7,086,089 | B2 | * | 8/2006  | Hrastar et al. | 726/22  |
| 7,472,282 | B1 | * | 12/2008 | Fujii et al.   | 713/186 |
| 2002/0046351 | A1 | * | 4/2002  | Takemori et al. | 713/201 |
| 2002/0112190 | A1 | * | 8/2002  | Miyagawa et al. | 713/201 |
| 2002/0176579 | A1 | * | 11/2002 | Deshpande et al. | 380/270 |
| 2003/0186679 | A1 | * | 10/2003 | Challener et al. | 455/410 |
| 2003/0200140 | A1 | * | 10/2003 | Hars           | 705/14  |

(Continued)

*Primary Examiner*—Meless N Zewdu

(57) ABSTRACT

Described are a system and method for detecting an unauthorized access point accessing a communication network. An authorized access point and/or an authorized mobile unit detects a beacon generated by a transmitting access point. The beacon includes identification information of the transmitting access point. A computing arrangement verifies the identification information of the transmitting access point with a preexisting database of the communication network. The preexisting database includes data corresponding to identification information of a plurality of authorized access points. The computing arrangement initiates a tracking procedure to determine a location of the unauthorized access point where the verification of the transmitting access point identification information with the preexisting database fails.

20 Claims, 3 Drawing Sheets

U.S. PATENT DOCUMENTS

2003/0217289 A1* 11/2003 Ammon et al. ............. 713/201
2003/0221006 A1* 11/2003 Kuan et al. ................. 709/225
2004/0003285 A1* 1/2004 Whelan et al. .............. 713/201

* cited by examiner

SYSTEM AND METHOD FOR DETECTION OF A ROUGE WIRELESS ACCESS POINT IN A WIRELESS COMMUNICATION NETWORK

PRIORITY CLAIM

The present application is a continuation of a U.S. patent application Ser. No. 10/212,291 filed Aug. 2, 2002 now U.S. Pat. No. 7,068,999, entitled "System and Method for Detection of a Rogue Wireless Access Point in a Communication Network". The entire disclosure of the prior application, is considered as being part of the disclosure of the accompanying application and is hereby expressly incorporated by reference herein.

BACKGROUND INFORMATION

The proliferation of IEEE 802.11 wireless protocol and the relatively inexpensive hardware for implementing wireless access to communication networks has created a number of security concerns. The wireless access to the network may be established via an access point ("AP"). If the AP is not configured for secure operations and/or the AP is placed where an unauthorized user may setup a link with it, then the security of the communication network may be compromised.

For example, an employee might decide to attach the AP to a company communication network without a proper authorization. In other words, the employee may be authorized to use the company network, but the use of his AP may not be authorized. The employee may have decided to use his AP for more convenient access to the company network. If the AP is not properly configured to provide secure access to only authorized users, then unauthorized users who obtain compatible hardware, may access the communication network. This may be of particular concern when the AP covers an area outside of the employer's facilities. Then, the unauthorized users may access the communication network without physically entering the employer's premises. Even if the employer detects an unauthorized, or rogue, AP, it is difficult to locate the rogue AP because of its relatively small size. There is, therefore, a great need for a system and method to detect and locate the rogue APs.

SUMMARY OF THE INVENTION

The present invention relates to a system and method for detecting an unauthorized access point accessing a communication network. An authorized access point and/or an authorized mobile unit detects a beacon generated by a transmitting access point. The beacon includes identification information of the transmitting access point. A computing arrangement verifies the identification information of the transmitting access point with a preexisting database of the communication network. The preexisting database includes data corresponding to identification information of a plurality of authorized access points. The computing arrangement initiates a tracking procedure to determine a location of the unauthorized access point where the verification of the transmitting access point identification information with the preexisting database fails.

DETAILED DESCRIPTION

Figure 1:
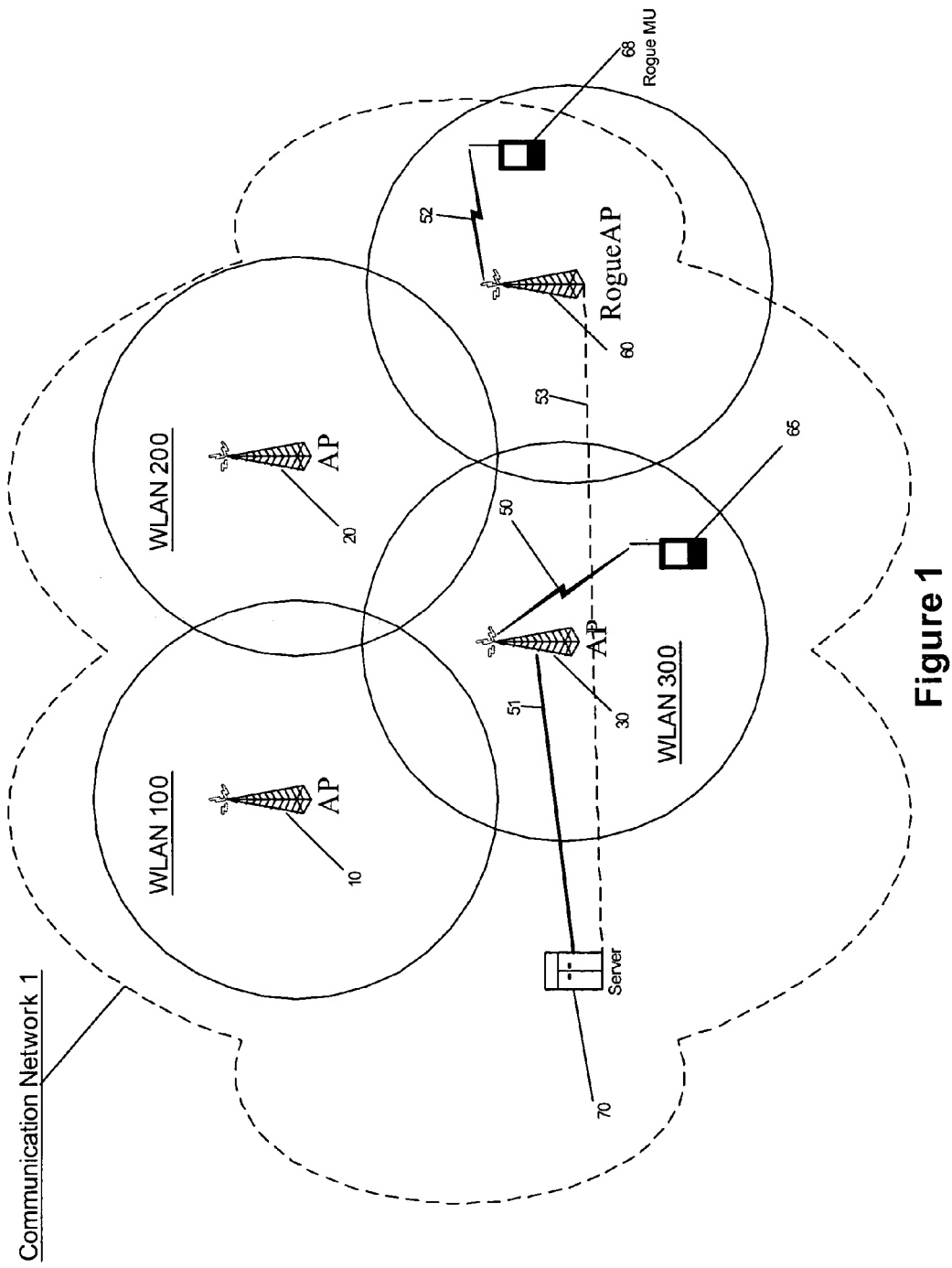
FIG. 1 shows an exemplary embodiment of a system according to the present invention.

FIG. 1 shows an exemplary embodiment of a communication network 1 according to the present invention. The communication network 1 may contain a plurality of wireless local area networks ("WLAN"s) 100-300. Each WLAN 100-300 may contain a plurality of authorized Access Points ("AP"s) 10-30. The communication network 1 may also include a plurality of authorized mobile units ("MU"s), e.g. MU 65 and a plurality of servers, e.g. a server 70. The APs 10-30 may be connected directly to the server 70 as shown, for example, by connection 51 between the server 70 and the AP 30. Each AP 10-30 may be assigned a name, by the network administrator, for ease of reference. This is similar to the practice of naming computers and servers on a network.

The MU 65 accesses the communication network 1 via the APs 10-30, depending where the MU 65 is located at a particular time. Periodically, the APs 10-30 transmit beacon signals. The beacon signals are used by the MU 65 to determine the AP 10-30 which provides the strongest signal. For example, the MU 65 may find, based upon the location shown in FIG. 1, that the AP 30 provides the best service. The content of the beacon signals will be discussed below.

If the user of the MU 65 attempts to access the server 70, the MU 65 first waits for a communication channel 50 to the AP 30 to be available. Once the communication channel 50 is available, the MU 65 transmits an authentication message to the AP 30 requesting access to the communication network 1. The authentication message may contain identification data, e.g., the user login name and the user login password.

Each of the APs 10-30, the server 70, or on some other computing entity of the communication network 1 may include a database of authorized devices and/or users. The database may also includes identification information about devices that are specifically prohibited from accessing the communication network 1. When the AP 30 receives the authentication message it performs an authentication process. The authentication process may include verifying the identification data received with the database. If the identification data is not verified, then the MU 65 is denied access to the communication network 1.

If the identification data is verified, then the AP 30 transmits a response approving the access of the MU 65 to the communication network 1. Once the MU 65 receives the approval from the AP 30, the communication channel 50 is available for the MU 65 to access the communication network 1 via the AP 30. For example, the user of the MU 65 may then access the server 70 by logging in with his username and password.

A problem arises when an unauthorized user desires to obtain access to the communication network 1, and in particular, to the server 70. In order to do this, the unauthorized user may utilize an unauthorized, or rogue, AP 60. The rogue AP 60 may be configured to check its resident database before approving access to the communication network 1. The resident database of the AP 60, configured by the unauthorized user may contain, for example, the user login name and/or the login password of the unauthorized user. Alternatively, the rogue AP 60 may be configured to approve access without verifying the identification data from the authentication message. The rogue AP 60 may then provide access to the communication network 1 by a rogue MU 68.

The unauthorized user may use the unauthorized MU 68 to access the server 70 via the connection 53. The MU 68 transmits an authentication message over a communication channel 52 to the rogue AP 60. The AP 60, configured by the unauthorized user, approves the access for the MU 68 to the communication network 1. The unauthorized user may gain access to the server 70 by attempting to login with a username and password, in the same manner as the authorized user.

Figure 2:
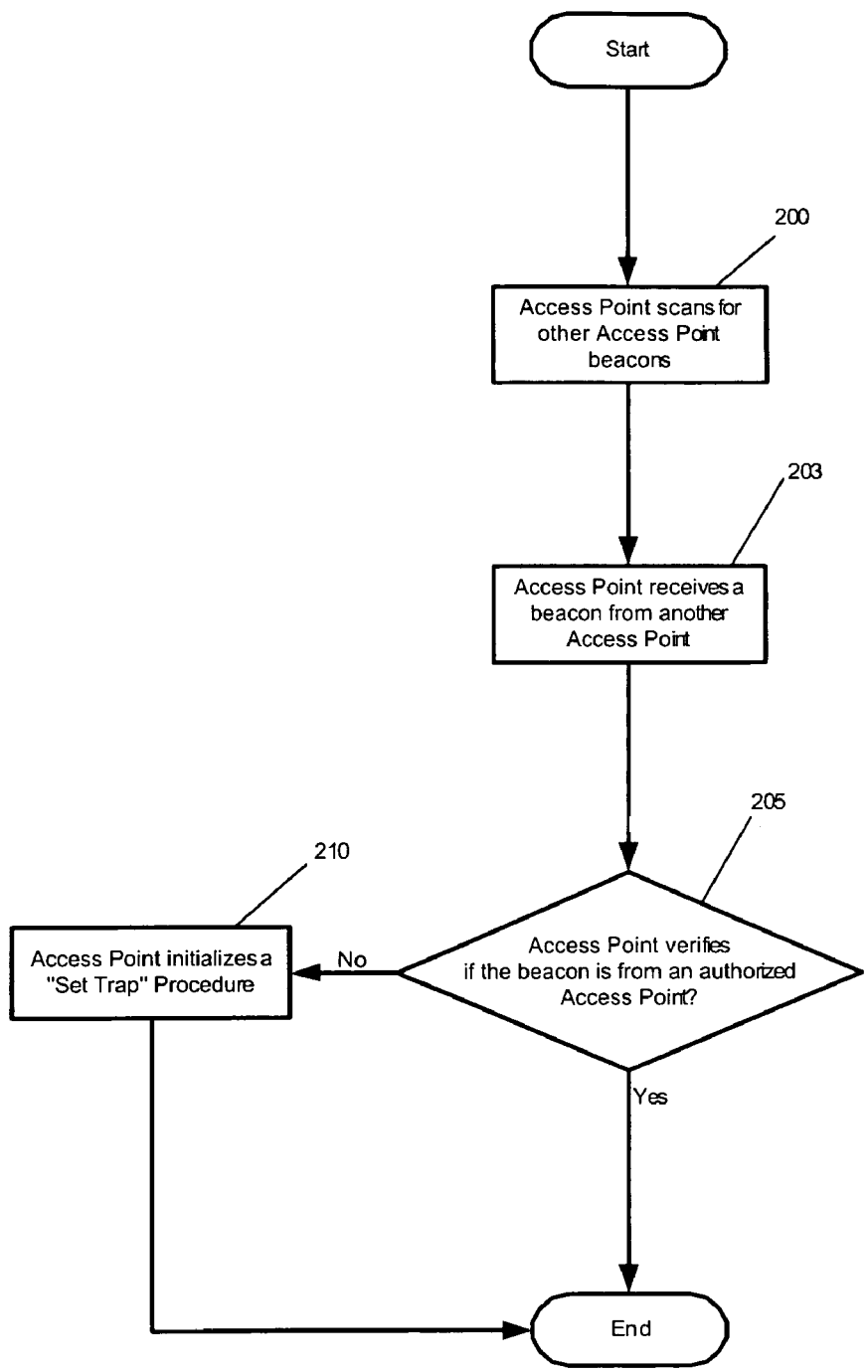
FIG. 2 shows an exemplary embodiment of a method according to the present invention.

FIG. 2 shows a method according to the exemplary embodiment of the present invention utilized to detect and locate the rogue AP 60. The method is described with reference to FIG. 1. Those skilled in the art will understand that other systems having varying configurations, for example, different numbers of APs, WLANs or MUs may be used to implement the exemplary method.

In step 200, the AP 10 scans for other AP beacons. Generally, the scan is performed when the AP 10 is initialized. These beacons are periodically transmitted by every AP 10-60 and they may be used by, e.g., the MUs 65-68 to detect whether a wireless network connection is available in a particular geographic area and, if so, which one of the APs 10-60 is available in that area.

In step 203, the scanning AP receives a beacon signal from another AP. The beacon signal may contain information including a MAC address of the transmitting AP, a service set identification ("SSID"), supported data rates, etc. The MAC address is an identifier assigned by the manufacturer and a portion of the MAC address is utilized as a manufacturer identification.

The SSID identifies a virtual local area network ("VLAN") that is served by a particular WLAN. The VLAN may encompass a single WLAN (e.g., WLAN 100) or a plurality of WLANs (e.g., WLANs 100-300). Conversely, WLAN 100 may serve a plurality of VLANs and a particular AP beacon, from an AP associated with WLAN 100, contain a list of SSIDs.

In step 205, the scanning AP determines whether the beacon received is from an authorized or unauthorized AP. This may be determined based on two different criteria. These criteria may be used alternatively or in conjunction to determine if the particular AP is unauthorized. Those skilled in the art would understand that there may be a plurality of other criteria used to authorize the access to the communication network 1.

The first criteria is to set the scanning AP to verify the manufacturer identification of the MAC address of the transmitting AP using a database containing manufacturer identifications for authorized access points. For example, assume a particular business may only use the APs manufactured by the XYZ corporation, the AP 10 is the scanning AP and the AP 60 is a rogue AP. Then the database in the AP 10 and the server 70 contains only the XYZ manufacturer identification. If the rogue AP 60 is not manufactured by the XYZ corporation, then the AP 10 will be able to determine that the rogue AP 60 is unauthorized. Alternatively, a database of valid manufacturer MAC addresses may be preset and used to verify whether the rogue AP 60 is authorized or not. This criteria may be expanded to check the entire MAC address or to include other portions of the data contained in the beacon signals.

As mentioned above, the identification message may also include the SSID. The other option, therefore, is to verify the SSID against a database containing authorized SSIDs. If this criteria is utilized, the network administrator or another authorized user may generate a list of valid SSIDs. Therefore, if the rogue AP 60 is manufactured by an authorized manufacturer but the SSID in the beacon is invalid, then the presence of the rogue AP 60 is detected. Those skilled in the art will understand that a system administrator may also insert other codes into the beacons of the authorized APs that may be used to identify authorized/unauthorized APs.

If the scanning AP 10 determines that the beacon is received from the rogue AP 60, which is unauthorized, the AP 10 initializes a "set trap" procedure (Step 210). The "set trap" procedure creates a record of information that may be useful for tracking the rogue AP 60. Such a record may include, for example, the MAC address, the name of the AP 10, as described above, and the SSID of the AP 10 which discovered the rogue AP 60, as well as the MAC address of the rogue AP 60. The record may also include the signal strength at which the beacon signal was received, the time and date when the record was created and the criteria used to detect the rogue AP 60 (e.g., unverified manufacturers MAC address, no matching SSID, etc.).

The record may be utilized to determine a location of the rogue AP 60. For example, assume only the APs 20 and 30 detect the rogue AP 60. Based upon this information, it may be determined that the rogue AP 60 is located in a geographical area close to both the APs 20 and 30, and farther from the AP 10.

Furthermore, if signal strength measurements were detected and recorded, then the location of the rogue AP 60 may be even more accurately determined. For example, if the AP 20 records a stronger signal strength value than the AP 30, it may be that the AP 60 is located closer to the AP 20. This determination may be made with additional precision if either or both the AP 20 and the AP 30 use directional antennas.

Once the information has been recorded, the "set trap" procedure may continue by setting an alarm throughout the appropriate WLAN 100 and, in particular, notifying a network administrator. The network administrator may then review details of the alarm and check the record. The network administrator may disconnect the rogue AP 60 from accessing the communication network 1. In an alternative exemplary embodiment of the present invention, the network administrator may set certain criteria and conditions where the rogue AP 60 may continue to access the communication network 1.

Alternatively, the record may be stored by the AP 10 and periodically retrieved by the server 70 or automatically forwarded by the AP 10 to the server 70. The server 70 may then display the records received from all the APs 10-30. The server 70 may also display a map of the communication network 1, e.g. FIG. 1, and overlay the alarms on the map. The server 70 may process the records received from the APs 10-30 to determine or predict, as described above, the approximate location of the rogue AP 60. The server 70 may then display the predicted location by shading in the area on the map. The system for handling communication of these records between the APs 10-30 and the server 70 may be implemented with the common simple network management protocol ("SNMP") or a similar protocol.

In an alternative exemplary embodiment of the present invention, a method called "indirect scanning" may be used to detect rogue APs. Instead of the relying solely on APs to scan for the rogue APs, the APs may request that MUs supporting rogue AP detection functionality perform the scanning operation as well. The MUs may then scan for beacons on all the network channels (e.g., all eight channels) and report the information back to the AP. The AP may then use the information received, along with results from its own scanning to detect and locate the rogue APs.

For example, assume that the MU 65 supports the rogue AP detection functionality and, as shown in FIG. 1, the AP 30 serves the location of the MU 65. When the MU 65 initially accesses the communication network 1, it reports to the AP 30 that it supports the rogue AP detection functionality. The AP 30 then records that the MU 65 supports rogue AP detection functionality for future reference along with any other MUs that may indicate support for the rogue AP detection. The AP 30 may then, periodically, send a directed message to the MU 65 requesting it to perform the scanning process (Step 200). The MU 65 then scans each channel, supported by the communication network's 1 protocol, for beacon signals, e.g., all 14 channels in a communication network 1 that use the IEEE 802.11 wireless protocol. Each channel is scanned for a time period long enough to have a high probability of detecting a beacon on the channel. When the MU 65 has scanned all the channels, it sends the results back to the AP 30. The AP 30 then continues the method from step 205. If the MU 65 moves out of the AP 30 coverage area, while performing the scan, then the MU 65 may abort the operation.

There are several advantages to using MUs to scan for rogue APs. One is that the AP may only scan on a single channel that it is configured to serve. The MU 65, on the other hand, may scan all channels supported by the communication network's protocol.

Another advantage of the utilizing MUs is that the AP cannot provide access to the network while it is performing the scanning process. Thus, this prevents access to the communication network 1 while the AP is performing step 200 of the rogue AP detection method. By having the AP delegate the scanning to the MU, the access to the communication network 1 through the AP remains available.

Yet another advantage to utilizing MUs for scanning is that the AP 30 is, generally, fixed in one location. This limits the possible beacon signals it can receive. The MU being mobile and at various distances away from the AP 30 may receive beacon signals that would otherwise be undetected by the AP 30.

The method according to the present invention may be performed continuously or during a predetermined time period. This may be implemented to limit the burden put on the APs 10-30 by the rogue AP detection process. For example, the AP 10 may be set to perform the process for a specified time period, e.g., every 5 minutes to every 8 hours. It may also be set to run only during certain time periods, e.g., between 12:00 AM and 8:00 AM. Alternatively, the AP 10 may be set up to continuously run the process and to perform no other tasks.

The method according to the present invention may also be implemented with the MU 65 as the detector, instead of the AP 10. The MU 65 may be carried around the communication network 1 to detect the rogue AP 60 beacon and determine its location. One advantage is that the MU 65 may be used check areas where there is no coverage from the authorized APs 10-30.

Figure 3:
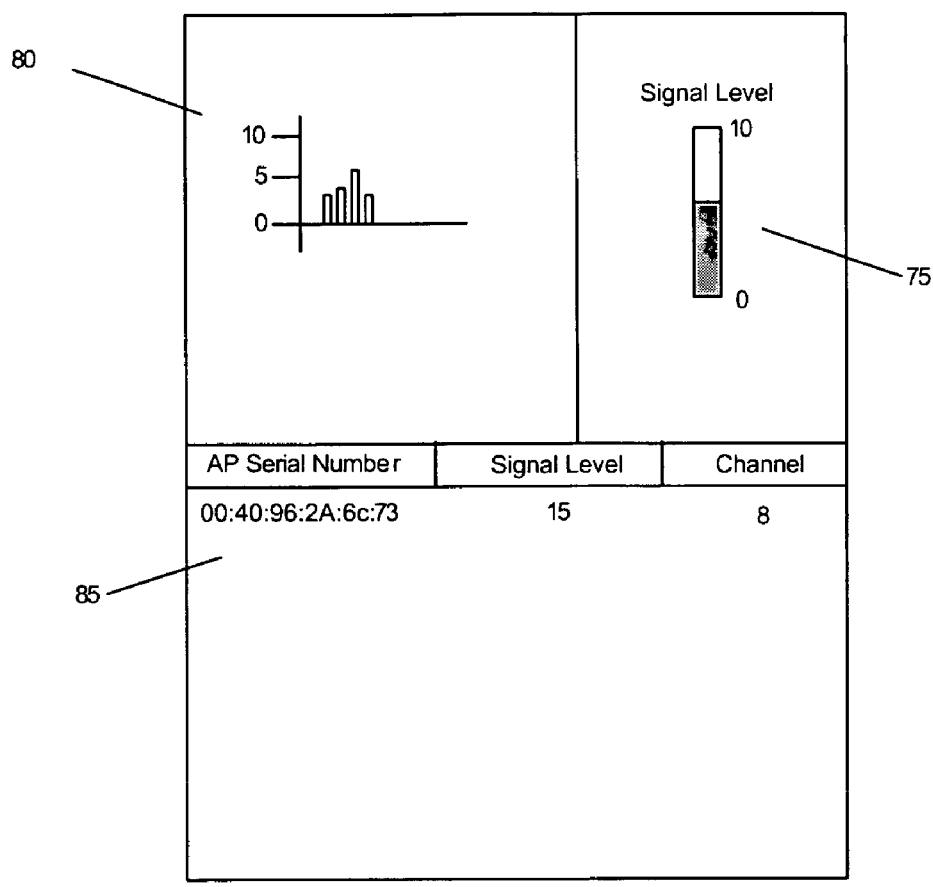
FIG. 3 shows an exemplary embodiment according to the present invention of a screen shot from a mobile unit display which is used to detect a rogue AP.

FIG. 3 shows an exemplary embodiment of a screen shot that may be displayed on the MU 65 when performing the rogue AP detection process. When the MU 65 finds the rogue AP 60 it may display the record on the rogue AP detected register 85. The information displayed from the record may be user selectable. For example, the MAC address and signal strength may be displayed.

The user of the MU 65 may specifically track the rogue AP 60 by selecting it from the rogue AP detected register 85. The last signal strength measurement for the rogue AP 60 is then displayed on a bar chart 75 and a graph of past signal strength values are shown on a graph 80. The user can then locate the rogue AP 60 by moving to various locations as guided by the increasing signal strength values to find it.

The present invention has been described with reference to an embodiment having the WLANs 100-300 with the APs 10-30, the single rogue AP 60, the one authorized MU 65 and one unauthorized MU 68 and the server 70. One skilled in the art would understand that the present invention may also be successfully implemented, for example, for a plurality of rogue APs, a plurality of APs in a WLAN, etc. Accordingly, various modifications and changes may be made to the embodiments without departing from the broadest spirit and scope of the present invention as set forth in the claims that follow. The specification and drawings are accordingly to be regarded in an illustrative rather than restrictive sense.

What is claimed is:

1. A device, comprising:
a communications arrangement providing at least one mobile unit with access to a communication network, wherein the communication arrangement scans a plurality of radio frequency channels to detect a beacon transmitted by an unverified access point in the communications network, the beacon including identification information of the unverified access point; and
a processor verifying the identification information with a preexisting database, the verifying comprising comparing a portion of a MAC (medium access controller) address representing a manufacturer identification included in the beacon to manufacturer identification information stored in the preexisting database and comparing a SSID (service set identification) included in the beacon to SSID information stored in the preexisting database, the preexisting database including identification information of a plurality of access points authorized to access the communications network, wherein when the verification of the identification information fails, the processor identifies the unverified access point as an unauthorized access point and sets conditions for which the unauthorized access point is allowed to access the communication network.

2. The device according to claim 1, wherein, when the verification fails, the processor initiates a tracking procedure to determine a location of the unauthorized access point.

3. The device according to claim 1, wherein the device is an authorized access point.

4. The device according to claim 1, wherein the identification information includes at least one of (i) a serial number of the corresponding unverified access point and (ii) a virtual private network identifier.

5. The device according to claim 1, wherein the processor notifies a network administrator when the verification fails.

6. The device according to claim 1, wherein the processor generates an activity record of activities of the unauthorized access point.

7. The device according to claim 6, wherein the activity record includes at least one of a manufacturer serial number, a virtual private network number, a time and date of the unauthorized access, a signal strength of the beacon, a time and date of subsequent communications with the unauthorized access point, a source and a destination of each of the subsequent communications and a signal strength of each of the subsequent communications.

8. The device according to claim 7, wherein the processor determines the location of the unauthorized access point as a function of the activity record and geographic locations of the device and at least two access points of the plurality of access points.

9. A system, comprising:
 a communications arrangement providing at least one mobile unit with access to a communication network, wherein the communication arrangement communicates with a plurality of access points authorized to communicate on the communications network, wherein the communications arrangement scans a plurality of radio frequency channels to detect a beacon transmitted by an unverified access point in the communications network;
 a memory storing identification information of the unverified access point that was received in the beacon from the unverified access point, the memory further storing a preexisting database including identification information of the plurality of authorized access points, the preexisting database storing at least one of a manufacturer identification information and a SSID (service set identification) information; and
 a processor performing a verification procedure by comparing a portion of a MAC (medium access controller) address representing a manufacturer identification included in the detected beacon to the stored manufacturer information in the preexisting database and a SSID included in the detected beacon to the stored SSID information in the database, wherein when the verification fails, the processor identifies the unverified access point as an unauthorized access point and sets conditions for which the unauthorized access point is allowed to access the communications network.

10. The system according to claim 9, wherein, when the verification fails, the processor determines a location of the unauthorized access point.

11. The system according to claim 9, wherein the identification information includes at least one of a manufacturer serial number of the corresponding unverified access point and a virtual private network identifier.

12. The system according to claim 9, wherein the processor notifies a network administrator of the detection of the unauthorized access point.

13. The system according to claim 9, wherein the system receives an activity record of activities of the unauthorized access point from the at least one of the plurality of authorized access points.

14. The system according to claim 13, wherein the activity record includes at least one of a manufacturer serial number, a virtual private network number, a time and date of the unauthorized access, a signal strength of the beacon, a time and date of subsequent transmissions by with the unauthorized access point, a source and a destination of each of the subsequent transmissions and a signal strength of each of the subsequent transmissions.

15. The system according to claim 14, wherein a location of the unauthorized access point is determined as a function of the activity record and a geographic location of the at least one of the plurality of access points.

16. A method, comprising:
 scanning, by a computing arrangement, a plurality of radio frequency channels in a wireless communications network to detect a beacon from an unverified access point, the beacon including identification information of the access point, the computing arrangement providing at least one mobile unit with access to the communication network;
 transmitting the identification information to the computing arrangement for performing a verification procedure, the verification procedure including comparing a portion of a MAC (medium access controller) address representing a manufacturer identification included in the detected beacon to stored manufacturer information in a preexisting database and comparing a SSID (service set identification) included in the detected beacon to stored SSID information in the preexisting database, the preexisting database comprising identification information of a plurality of access points authorized to communicate on the communications network; and
 when the unverified access point fails the verification procedure, identifying the unverified access point as an unauthorized access point and generating an activity record of activities of the unauthorized access point.

17. The method according to claim 16, further comprising:
 transmitting the activity record to the computing arrangement.

18. The method according to claim 16, wherein the activity record includes at least one of a manufacturer serial number, a virtual private network number, a time and date of the unauthorized access, a signal strength of the beacon, a time and date of subsequent transmissions by the unauthorized access point, a source and a destination of each of the subsequent transmissions and a signal strength of each of the subsequent transmissions.

19. The method according to claim 16, further comprising:
 determining a location of the unauthorized access point; and transmitting the location to the computing arrangement.

20. An arrangement, comprising:
 a communications means for providing at least one mobile unit with access to a communication network, wherein the communication arrangement detects a beacon transmitted by an unverified access point in the communications network, the beacon including corresponding identification information of the unverified access point; and
 a processing means for verifying the identification information with a preexisting database, the preexisting database including identification information for a plurality of access points authorized to access the communications network, wherein when the verification of the identification information fails, the unverified access point is an unauthorized access point, the processing means sets conditions for allowing the unauthorized access point to access the communications network,
 wherein the verifying comprises comparing a portion of a MAC (medium access controller) address representing a manufacturer identification included in the detected beacon to authorized manufacturer information in the preexisting database and comparing a SSID (service set identification) included in the detected beacon to authorized SSID information in the preexisting database.

* * * * *